(12) United States Patent
Sigonneau et al.

(10) Patent No.: US 6,464,289 B2
(45) Date of Patent: Oct. 15, 2002

(54) REINFORCED FRONT-FACE SUPPORT FOR A MOTOR VEHICLE

(75) Inventors: Jacques Sigonneau, Theuvy-Acheres; Valérie Sandjivy, Paris, both of (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/742,014

(22) Filed: Dec. 22, 2000

(65) Prior Publication Data

US 2002/0017807 A1 Feb. 14, 2002

(30) Foreign Application Priority Data

Dec. 29, 1999 (FR) ............................................. 99 16665

(51) Int. Cl.⁷ ............................................. B62D 25/08
(52) U.S. Cl. ................... 296/194; 296/203.02; 296/188
(58) Field of Search ................ 296/188, 194, 296/203.02, 901; 180/68.4

(56) References Cited

U.S. PATENT DOCUMENTS 5,190,803 A * 3/1993 Goldbach et al. ........... 264/261
5,658,041 A * 8/1997 Girardot et al. ........... 180/68.4
6,186,583 B1 * 2/2001 Martin ....................... 296/194
6,189,958 B1 * 2/2001 Guyomard et al. ........ 180/68.4
6,216,810 B1 * 4/2001 Nakai et al. ............... 180/68.4
6,273,496 B1 * 8/2001 Guyomard et al. ......... 296/194

FOREIGN PATENT DOCUMENTS

| EP | 0370342 | 5/1990 |
|---|---|---|
| EP | 0658470 | 6/1995 |

* cited by examiner

*Primary Examiner*—Joseph D. Pape
*Assistant Examiner*—Jason Morrow
(74) *Attorney, Agent, or Firm*—Liniak, Berenato, Longacre & White

(57) ABSTRACT

A front-face support for various components at the front end of the vehicle has a plastic body overmolded onto a reinforcement enhancing the mechanical strength of the support. The reinforcement is a fabric of fibers, for example glass or carbon fibers, or a cable advantageously composed of steel wires.

2 Claims, 1 Drawing Sheet

REINFORCED FRONT-FACE SUPPORT FOR A MOTOR VEHICLE

FIELD OF THE INVENTION

The invention relates to a front-face support for a motor vehicle.

BACKGROUND OF THE INVENTION

It is current practice nowadays, when assembling a motor vehicle, to put various components in place at the front of it, such as lighting units, heat exchangers, audible warning devices, hood lock, in the form of a subassembly in which these components are fixed onto a support known as front-face support. Such a subassembly can be produced by an equipment manufacturer, and the automobile constructor has only to offer it up at the front of the vehicle and to fix the front-face support onto the structural elements of the vehicle, thus indirectly fixing the components carried by the front-face support, without needing to handle or fix these components individually onto the structure of the vehicle. This constitutes a considerable simplification in the operations of assembling the vehicle.

EP 0 658 470 A describes such a front-face support comprising a body made of plastic overmolded onto a metal reinforcement made from stamped sheet metal.

Reinforcement is necessary in order to confer on the front-face support the mechanical strength required to allow stable fixing of the components which it carries. However, producing a reinforcement implies expensive operations of stamping and of anti-corrosion protection.

The object of the invention is to dispense with these operations, and thus to simplify the production of the front-face support and make it more economical.

SUMMARY OF THE INVENTION

According to the invention, there is provided a front-face support suitable for supporting a multiplicity of components of a motor vehicle and for being fixed to the front end of the vehicle, comprising a plastic body overmolded onto a reinforcement enhancing the mechanical strength of the support, wherein the reinforcement comprises a multiplicity of elongate elements in the form of mutually combined filaments or fibers.

Optional, complementary or alternative characteristics of embodiments of the invention are set out below:

- the said elongate elements are combined to form at least one layer of fabric,
- the said elongate elements are mineral fibers,
- the said mineral fibers are made of a material chosen from carbon and glass,
- the said elongate elements are combined to form at least one cable,
- the said elongate elements are steel wires.

BRIEF DESCRIPTION OF THE DRAWINGS

The characteristics and advantages of the invention will become clearer on reading the description below, and referring to the attached drawings, in which.

DESCRIPTION OF THE PREFERRED EMBODIMENTS

Figure 1:
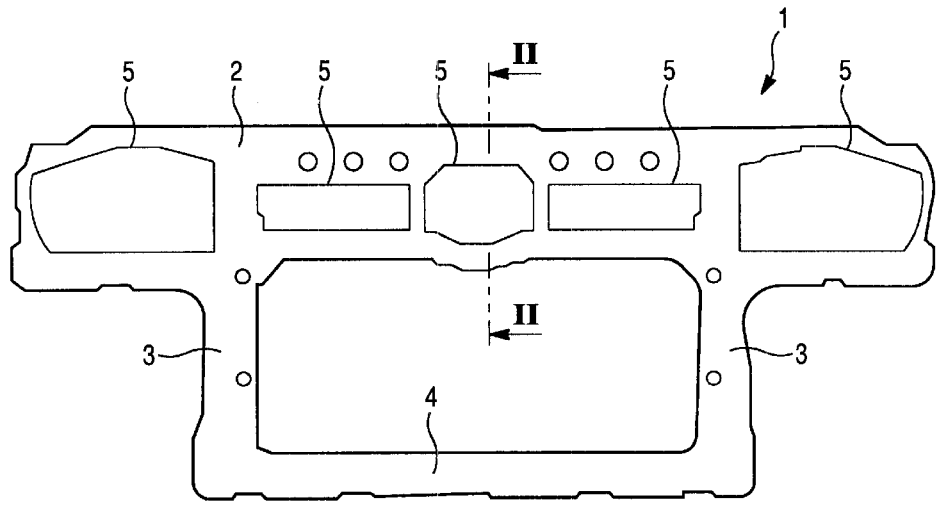
FIG. 1 is a front view of a first preferred embodiment of a front-face support according to the invention.

In the various figures, like reference numerals refer to like parts.

FIG. 1 shows a front-face support 1 of conventional overall shape consisting of an upper crosspiece 2, of two uprights 3 extending downwards from the upper crosspiece, and of a lower crosspiece 4 linking the lower ends of the uprights 3. The upper crosspiece features recesses and/or apertures 5 intended to house components which have to be mounted on the vehicle by means of the support 1.

Figure 2:
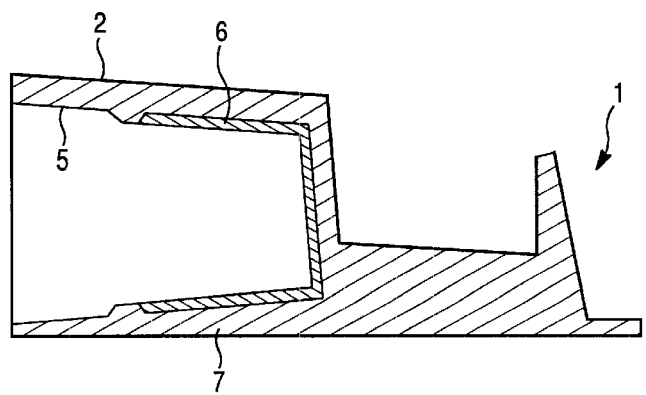
FIG. 2 is a partial view of this support, in section along the line II—II of FIG. 1.

The vertical sectional plane of FIG. 2, which coincides, after assembly, with the median longitudinal plane of the vehicle, passes through one of the recesses 5. A reinforcement 6 in the form of a fabric of fibers, for example glass or carbon fibers, is buried in the plastic constituting a body 7, this body and the reinforcement 6 together forming the support 1. In the example illustrated, the reinforcement 6 is adjacent to the wall of the recess 5. This can be achieved by applying the fabric on a protruding part of the mold, intended to form the recess, before closure of the mold and injection of the plastic. No prior operation for shaping the fabric is necessary. Clearly, it is also possible to position the reinforcement, by any known means, in such a way that it is located within the plastic, spaced away from all the walls of the body 7. The fabric reinforcement may extend over all or part of the length of the crosspiece 2. It may be produced in the form of a continuous layer or of several layers offset from one another in the longitudinal direction of the crosspiece (lateral direction of the vehicle) and/or from top to bottom and/or from the front towards the rear of the vehicle. The layers may be in mutual contact or spaced apart from one another.

Figure 3:
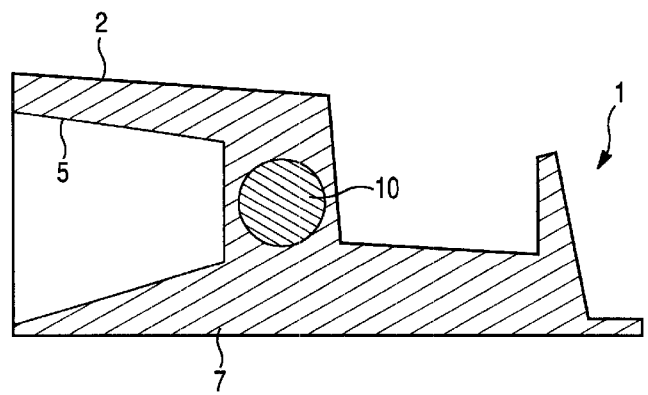
FIG. 3 is a view similar to FIG. 2 relating to another preferred embodiment of a front-face support according to the invention.

In FIG. 3, where the same reference numbers as in FIG. 2 are used in order to designate identical or similar elements, the fabric reinforcement is replaced by a reinforcement 10 in the form of a cable buried in the thickness of the body 7. In particular, this may take the form of a cable made from steel wires such as those used in various technical fields, especially for the transmission of tensile forces. In the same way as the fabric 6, the cable 10 may extend over all or part of the length of the crosspiece 2. It may be put in place in the mold under tension or in the relaxed state.

It is possible, according to the invention, to combine together a reinforcement in the form of fabric and a reinforcement in the form of cable, as well as to combine one and/or the other with any other types of reinforcements.

The reinforcement of the invention may also be provided in parts of the front-face support other than the upper crosspiece.

What is claimed is:

1. A front-face support suitable for supporting a multiplicity of components of a motor vehicle and for being fixed to the front end of the vehicle, comprising a plastic body overmolded onto a reinforcement enhancing the mechanical strength of the support, wherein the reinforcement comprises a multiplicity of elongated elements in the form of mutually combined filaments or fibers, in which said elongated elements are combined to form at least one cable.

2. The front-face support of claim 1, in which the said elongate elements are steel wires.

* * * * *